(12) United States Patent
Cui et al.

(10) Patent No.: US 11,190,620 B2
(45) Date of Patent: Nov. 30, 2021

(54) METHODS AND ELECTRONIC DEVICES FOR DATA TRANSMISSION AND RECEPTION

(71) Applicant: EMC IP Holding Company LLC, Hopkinton, MA (US)

(72) Inventors: Wei Cui, Beijing (CN); Sanping Li, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/381,719

(22) Filed: Apr. 11, 2019

(65) Prior Publication Data

US 2019/0327342 A1    Oct. 24, 2019

(30) Foreign Application Priority Data

Apr. 20, 2018    (CN) .......................... 201810362378.4

(51) Int. Cl.
*H04L 29/06*    (2006.01)
*G06N 20/00*    (2019.01)

(52) U.S. Cl.
CPC ............. *H04L 67/42* (2013.01); *G06N 20/00* (2019.01)

(58) Field of Classification Search
CPC ................................ H04L 67/42; G06N 20/00
USPC ........................................................ 709/217
See application file for complete search history.

(56) References Cited

U.S. PATENT DOCUMENTS

| 2013/0136125 | A1* | 5/2013 | Jain | H04L 67/08 370/392 |
| 2014/0006553 | A1* | 1/2014 | Dambayashi | H04L 67/10 709/217 |
| 2014/0172830 | A1* | 6/2014 | Yoshino | G06F 16/90335 707/722 |
| 2015/0341449 | A1* | 11/2015 | Lee | H04L 51/08 709/203 |
| 2016/0269502 | A1* | 9/2016 | Guerin | H04L 9/08 |
| 2017/0111166 | A1* | 4/2017 | Zheng | G06F 8/658 |
| 2019/0158274 | A1* | 5/2019 | Tormasov | H04L 9/3297 |

FOREIGN PATENT DOCUMENTS

JP             2017153044 A  *  8/2017  ............... H04L 9/32

* cited by examiner

*Primary Examiner* — Joseph L Greene
(74) *Attorney, Agent, or Firm* — Ryan, Mason & Lewis, LLP

(57) ABSTRACT

Embodiments of the present disclosure relate to methods and an electronic device for transmitting and receiving data. The data transmission method includes: determining a hash value of original data to be transmitted; determining whether the hash value exist in a predetermined set of hash values; in response to the hash value being present in the set of hash values, transmitting the hash value, rather than the original data, to a server; and in response to the hash value being absent from the set of hash values, transmitting the original data to the server; and adding the hash value to the set of hash values. The embodiments of the present disclosure can avoid transmitting duplicated data between a client and a server, and it is not required to add extra remote procedure calling commands between the client and the server.

20 Claims, 16 Drawing Sheets

METHODS AND ELECTRONIC DEVICES FOR DATA TRANSMISSION AND RECEPTION

RELATED APPLICATION(S)

The present application claims priority to Chinese Patent Application No. 201810362378.4, filed Apr. 20, 2018, and entitled "Methods and Electronic Devices for Data Transmission and Reception," which is incorporated by reference herein in its entirety.

FIELD

Embodiments of the present disclosure generally relate to the field of data transmission and data reception, and more specifically relate to methods, electronic devices and a computer readable program for transmitting and receiving data between a client device and a server.

BACKGROUND

Currently, a lot of data processing and computing tasks are performed through dedicated processors. For example, a Graphical Processing Unit (GPU) is a common dedicated processor, which is widely used as an accelerator for intensive computing tasks, such as high performance computing (HPC), machine learning (ML) or deep learning (DL), and the like, due to its high performance. The GPU and a Central Processing Unit (CPU) are utilized simultaneously to provide GPU accelerated computing. The GPU accelerated computing can transfer a computing-intensive workload of an application program to the GPU, while the remaining program code is still run by the CPU. From a user's perspective, the execution speed of the application program is accelerated significantly.

Since a dedicated processor, such as GPU, is generally expensive, the overall utilization of a dedicated processor is quite low if each user only uses its local dedicated processor. Currently, a client-server model is used to build an architecture of a shared dedicated processor to improve the utilization of the dedicated processor. For an application, such as machine learning, it is typically required to transmit a large amount of data (for example, images) between the client and the server. Thus, a large amount of network bandwidth resources will be occupied. Therefore, how to reduce an amount of data transmitted between the client and the server in the architecture is a problem to be solved.

SUMMARY

Embodiments of the present disclosure provide a method of data transmission, a method of data reception, an electronic device and a computer readable storage medium, which can avoid transmitting duplicated data between a client and a server.

In a first aspect of the present disclosure, there is provided a data transmission method. The method comprises: determining a hash value of original data to be transmitted; determining whether the hash value is present in a predetermined set of hash values; in response to the hash value being present in the set of hash values, transmitting the hash value, not the original data, to a server; and in response to the hash value being absent from the set of hash values, transmitting the original data to the server, and adding the hash value to the set of hash values.

In a second aspect of the present disclosure, there is provided a method of data reception. The method comprises: receiving data; determining a type of the data; in response to the data being original data to be received, determining a hash value of the original data, and storing the original data with the hash value; in response to the data being a hash value of the original data, obtaining the original data with the hash value.

In a third aspect of the present disclosure, there is provided an electronic device. The electronic device comprises a processor and a memory. The memory stores instructions which, when executed by the processor, causes the electronic device to perform steps of: determining a hash value of original data to be transmitted; determining whether the hash value is present in a predetermined set of hash values; in response to the hash value being present in the set of hash values, transmitting the hash value, not the original data, to a server; and in response to the hash value being absent from the set of hash values, transmitting the original data to the server, and adding the hash value to the set of hash values.

In a fourth aspect of the present disclosure, there is provided an electronic device. The electronic device comprises a processor and a memory. The memory stores instructions which, when executed by the processor, causes the electronic device to perform steps comprising: receiving data; determining a type of the data; in response to the data being original data to be received, determining a hash value of the original data, and storing the original data with the hash value; in response to the data being a hash value of the original data, obtaining the original data with the hash value.

In a fifth aspect of the present disclosure, there is provided a computer readable storage medium storing computer executable instructions which, when executed, causes a machine to perform the method in accordance with the first aspect or second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of example embodiments of the present disclosure will become more apparent, through the detailed description of example embodiments of the present disclosure with reference to the accompanying drawings, in which the same reference symbols generally represent the same components.

DETAILED DESCRIPTION

Figure 1:
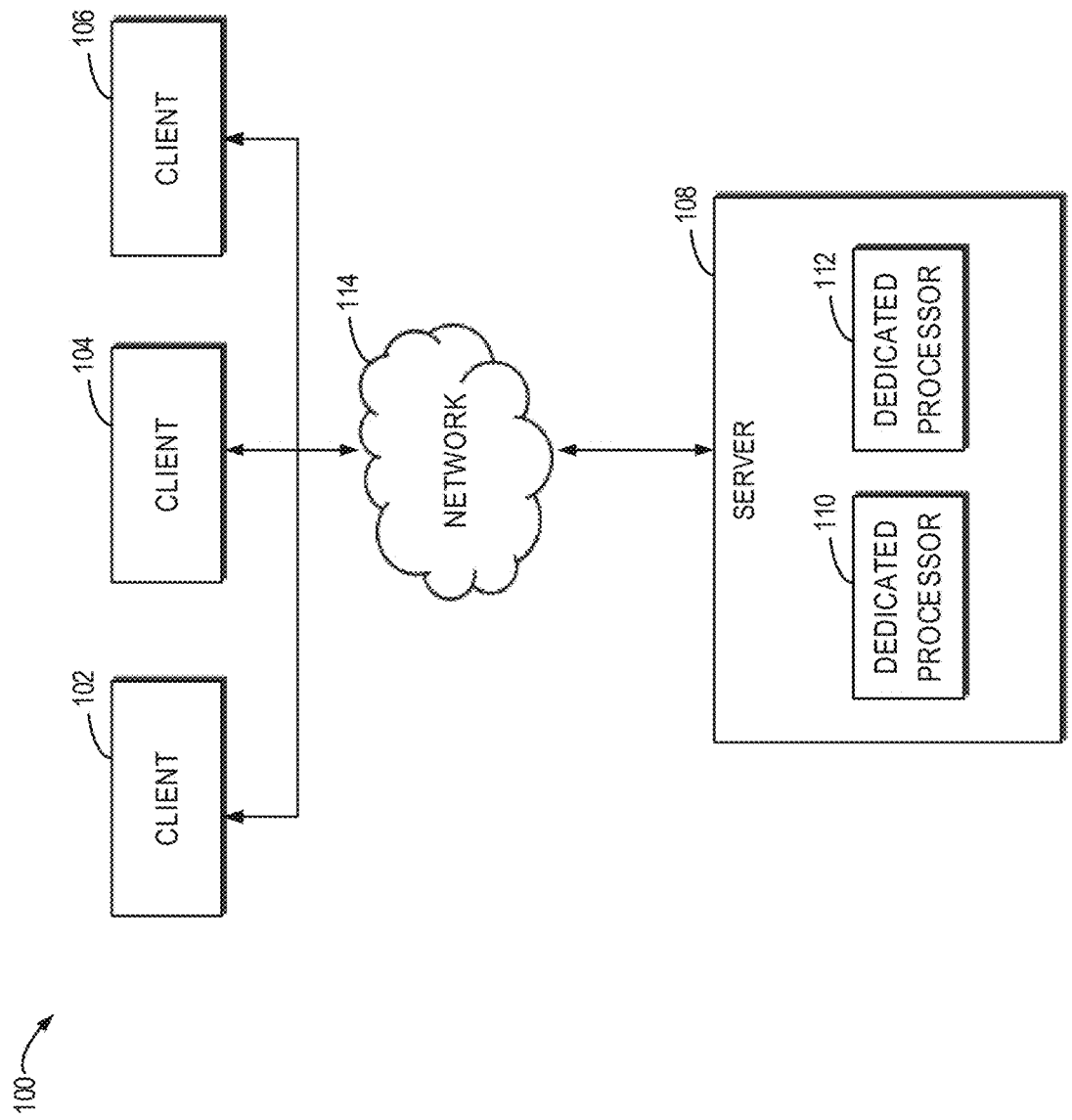
FIG. 1 illustrates a diagram of an architecture for providing a shared dedicated processor.

Principles of the present disclosure will now be described with reference to various example embodiments illustrated in the drawings. Although the drawings illustrate preferred embodiments of the present disclosure, it would be appreciated that description of those embodiments is merely to enable those skilled in the art to better understand and further implement the present disclosure and is not intended to limit the scope disclosed herein in any manner.

In order to clarify embodiments of the present disclosure, an architecture of a shared dedicated processor, a procedure of training a model under the architecture, existing data transmission methods under the architecture and problems of the existing methods are described with reference to FIGS. 1-4. Then, the solution according to embodiments of the present disclosure will be described with reference to FIGS. 5-9.

FIG. 1 illustrates a diagram of architecture 100 for providing a shared dedicated processor. As shown, the architecture 100 can include clients 102, 104 and 106, a server 108 and a network 114. Although FIG. 1 shows three clients 102, 104 and 106 and a server 108, it would be appreciated by those skilled in the art that the architecture 100 can include any number of clients and any number of servers.

The clients 102, 104 and 106 can be user equipment connected to the server 108 via the network 114, such as a desk computer, laptop computer, tablet computer, smart phone and the like. The clients 102, 104 and 106 can run an application program thereon, such as a high performance computing application, machine learning application, deep learning application and the like.

The server 108 provides a shared dedicated processor for the applications running on the clients 102, 104 and 106, such as a shared GPU, a shared Field Programmable Gate Array (FPGA) and the like, so as to provide accelerated computing. The server 108 can include dedicated processors 110 and 112. Although FIG. 1 only shows two dedicated processors 110 and 112, it would be appreciated by those skilled in the art that the server 108 can include any number of dedicated processors. Besides the dedicated processors 110 and 112, the server 108 can include other components not shown, for example a general processor such as a Central Processing Unit (CPU), a storage system and the like.

The clients 102, 104 and 106 expose a virtual dedicated processor interface (not shown in FIG. 1) to a user. When the application programs on the clients 102, 104 and 106 request to invoke the virtual dedicated processor interface, a Remote Procedure Call (RPC) channel is created between the clients 102, 104 and 106 and the server 108. The created RPC channel is used to transmit commands representing dedicated processor functions. For example, these commands can include duplicating data on the clients 102, 104 and 106 onto the dedicated processors 110 and 112, running the dedicated processor function, duplicating data on the dedicated processors 110 and 112 onto the clients 102, 104 and 106, and the like.

Figure 2:
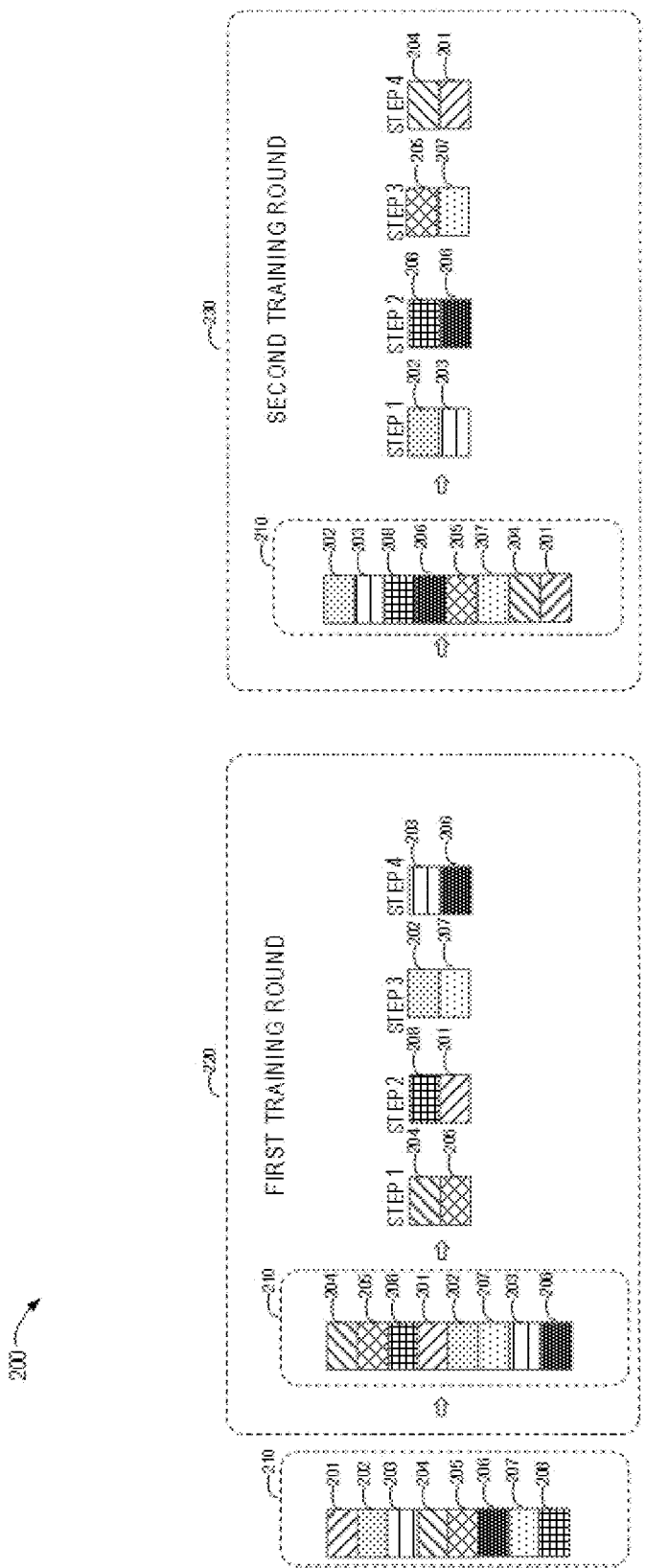
FIG. 2 illustrates a diagram of a procedure of training a deep learning model using the architecture of FIG. 1.

The architecture 100 as shown in FIG. 1 is used to promote the performance of the machine learning training. FIG. 2 illustrates a diagram of a procedure 200 of training a machine learning model under the architecture 100.

A dataset 210 is provided for training a machine learning model. The dataset 210 can include a plurality of data blocks 201, 202, 203, 204, 205, 206, 207 and 208. For example, during training of a model for facial recognition, each data block can represent a facial image; and during training of a model for speech recognition, each data block can represent a piece of speech, and the like. The dataset 210 can be stored in a memory of the clients 102, 104 and 106, or can be stored in cloud.

During the course of model training utilizing the dataset 210, multiple training rounds 220 and 230 are typically involved. Although FIG. 2 only shows two training rounds, it would be appreciated by those skilled in the art that the embodiments of the present disclosure are not limited to two training rounds. In each training round 220 or 230, full access to the dataset 210 for training is made, so as to constantly refine the trained model.

Each training round 220 or 230 is comprised of a plurality of training steps. In each training round 220 or 230, the dataset 210 is first sorted randomly and then divided into subsets of an equal size for different training steps. As shown in FIG. 2, in the first training round 220, the dataset 210 is sorted randomly into the data block 204, data block 205, data block 208, data block 201, data block 202, data block 207, data block 203 and data block 206. In the second training round 230, the dataset 210 is sorted randomly into the data block 202, data block 203, data block 208, data block 206, data block 205, data block 207, data block 204 and data block 201. It would be appreciated by those skilled in the art that the number and the sequence of the data blocks as shown in FIG. 2 are provided only as an example, and embodiments of the present disclosure are not limited in this regard.

As shown, the randomly sorted dataset 210 is then divided into a plurality of subsets of an equal size for different training steps, and each subset is required to be duplicated from the clients 102, 104 and 106 onto the dedicated processors 110 and 112 in the server 108, for use by the dedicated processors 110 and 112 to train the model. For example, in the first training round 220, the data block 204 and the data block 205 are applied to step 1, the data block 208 and the data block 201 are applied to step 2, the data block 202 and the data block 207 are applied to step 3, and the data block 203 and the data block 206 are applied to step 4. In the second training round 230, the data blocks 202 and 203 are applied to step 1, the data blocks 208 and 206 are applied to step 2, the data blocks 205 and 207 are applied to step 3, and the data blocks 204 and 201 are applied to step 4. It would be appreciated by those skilled in the art that the number of steps and the number of data blocks included in the subset, as shown in FIG. 2, are only provided as an example, and embodiments of the present disclosure are not limited in this regard.

Figure 3:
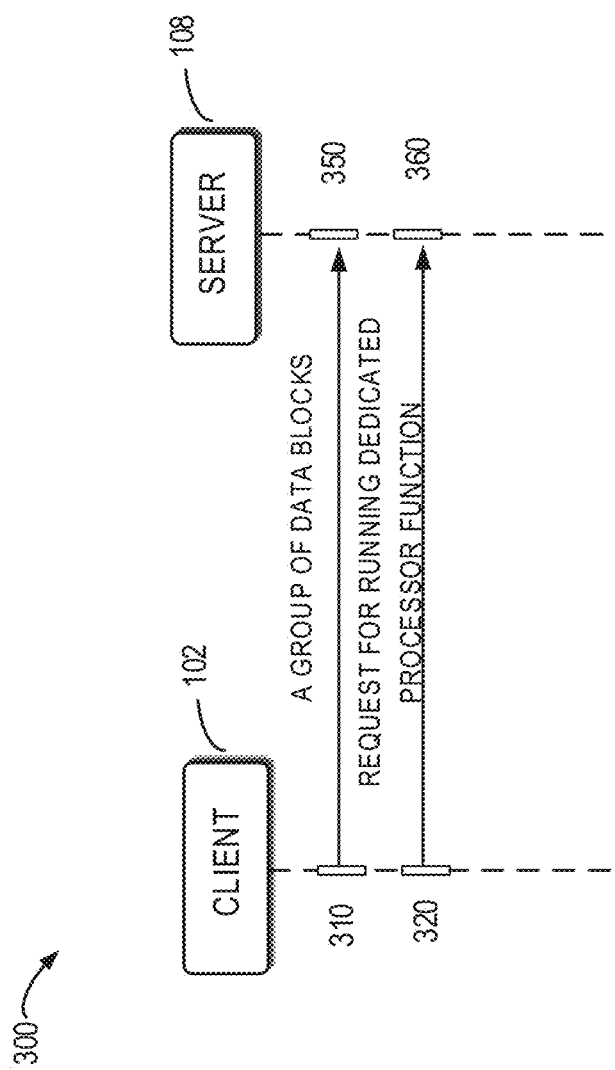
FIG. 3 illustrates a flowchart of transmitting data between a client and a server without data de-duplication.

In each training step, it is required to transmit the data blocks used at this step from the clients 102, 104 and 106 to the server 108. FIG. 3 is a diagram of a procedure 300 of data transmission between the client 102 and the server 108, without data de-duplication.

The client 102 transmits (310) a group of data blocks to a server 108, for example data blocks 204 and 205 for step 1 of the first training round 220. The server 108 duplicates (350) the received group of data blocks onto the dedicated processors 110 and 112. The client 102 transmits (320) a request for calling a dedicated processor function to the server 108. Based on the received request, the server 108 causes (360) the dedicated processors 110 and 112 to perform model training using the data blocks duplicated onto the dedicated processors 110 and 112. For each training step, the above procedure is repeated between the client 102 and the server 108, so as to constantly refine the trained model.

The procedure 300 as shown in FIG. 3 may result in transmission of a large amount of duplicated data between the client 102 and the server 108, causing waste of time and resource over the network transmission. If the network bandwidth is relatively low, the dedicated processors 110 and 112 will wait for data all the time, thus affecting the performance of the dedicated processors 110 and 112. For example, it is required to transmit the data block 204 from the client 102 to the server 108 at step 1 of the first training round 220, and it is further required to transmit the data block 204 from the client 102 to the server 108 at step 4 of the second training round 230. As the training rounds are continuously increased, more network resources will be consumed, which may even result in network congestion. This further causes the dedicated processors 110 and 112 to wait for data and thus the performance of the dedicated processors is affected.

Figure 4:
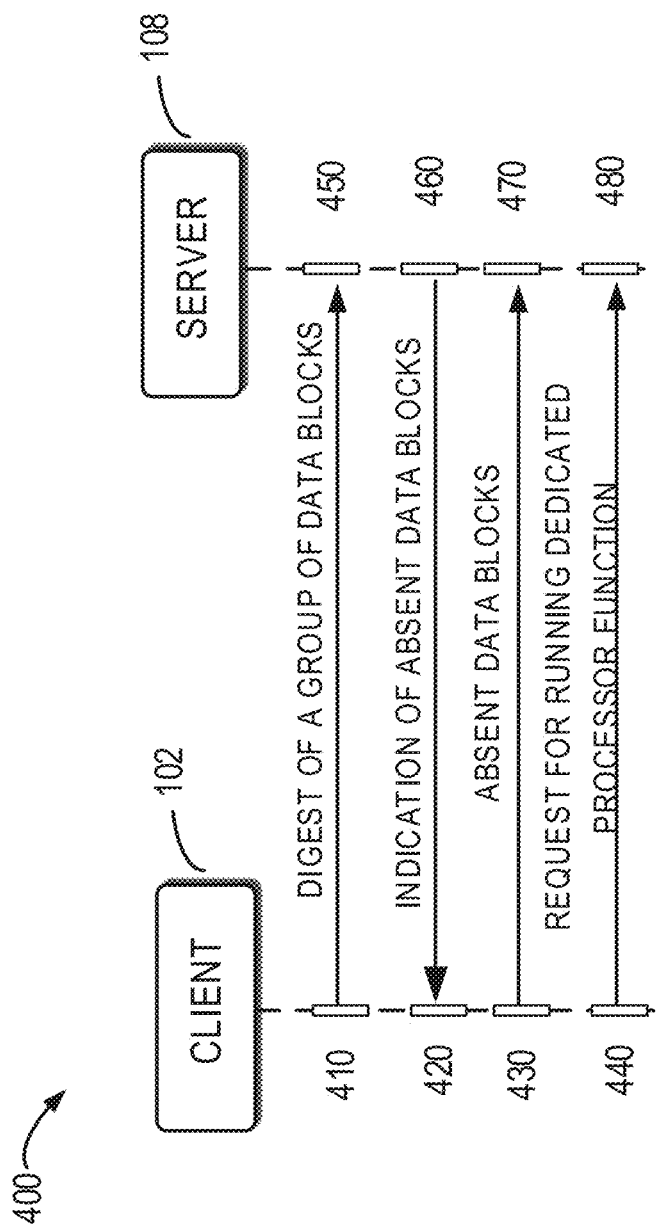
FIG. 4 illustrates a flowchart of an existing method of avoiding data duplication.

For this problem, a method of avoiding transmission of duplicated data between the client 102 and the server 108 has been proposed. FIG. 4 illustrates a flowchart of a method 400 of avoiding transmission of duplicated data.

The client 102 determines a digest of a group of data blocks, and transmits (410) the digest to the server 108. The server 108 determines (450) which data blocks in the group of data blocks are absent from the server 108, based on the received digest. The server 108 transmits (460) an indication of the absent data blocks to the client 102. The client 102 receives (420) the indication. The client 102 transmits (430) the absent data blocks on the server 108 to the server 108, based on the indication. The server 108 duplicates (470) the received data blocks to the dedicated processors 110 and 112. The client 102 transmits (440) a request for performing the dedicated processor function. Based on the received request, the server 108 performs an accelerated operation (480) using the dedicated processors.

The method 400 uses a digest of data blocks to avoid duplicated transmission of data. In a case where the network bandwidth is low, a better performance can be obtained than from the method 300. However, as compared to the method 300, it adds an indication for transmitting the absent data blocks and remote procedure calling commands for transmitting the absent data blocks between the client 102 and the server 108. In a case that network latency (queries per second) is huge, it may take a long time for each remote procedure calling command to arrive at the destination, causing the dedicated processors to obtain the required data until these commands complete, and further affecting the performance of the dedicated processors.

On the other hand, when the network bandwidth is great (for example, when the infinite bandwidth technology is used), the method 300 may enable fast data transmission to the server 108, even though there is duplication in the data. However, the method 400 needs to transmit extra remote procedure calling commands between the client 102 and the server 108, resulting in a longer waiting time for the dedicated processors 110 and 112. In this circumstance, the method 400 is not as good as the method 300.

In view of this, embodiments of the present disclosure propose a solution of transmitting data between the client and the server, which can avoid transmission of duplicated data while ensuring that no extra remote procedure calling incurs between the client and the server, thereby preventing the performance of the dedicated processors from being influenced by the network environment.

In the solution according to embodiments of the present disclosure, a predetermined set of hash values is maintained at a client, which stores hash values of original data having been transmitted previously. For original data to be transmitted (for example, data blocks as stated above), it is determined whether original data has been previously transmitted, by determining whether the hash value of the original data is present in the set of hash values. If the original data has been transmitted previously, the hash value is directly transmitted to the server, instead of the original data; otherwise, the original data are transmitted to the server, and the hash value thereof is added to the set of hash values. Correspondingly, a data store is maintained at a server side, which stores original data according to the hash value of the original data. If the server receives the hash value of the original data, the original data are obtained from the data store based on the hash value. If the server receives the original data, the hash value of the original data is used to store the original data into the data store.

In the solution according to embodiments of the present disclosure, it is determined at the client whether the original data to be transmitted have been transmitted previously, without a need of transmitting an indication of the absent data and the absent data between the client and the server back and forth (as shown in FIG. 4). As compared with the existing method 400, this reduces the number of remote calling commands and avoids transmission of duplicated data simultaneously. Further, because the number of the remote calling commands is reduced, the waiting time at the server side will not become longer in any network environment (regardless of the network bandwidth and the network latency), thereby ensuring the performance of the dedicated processors at the server side.

Figure 5:
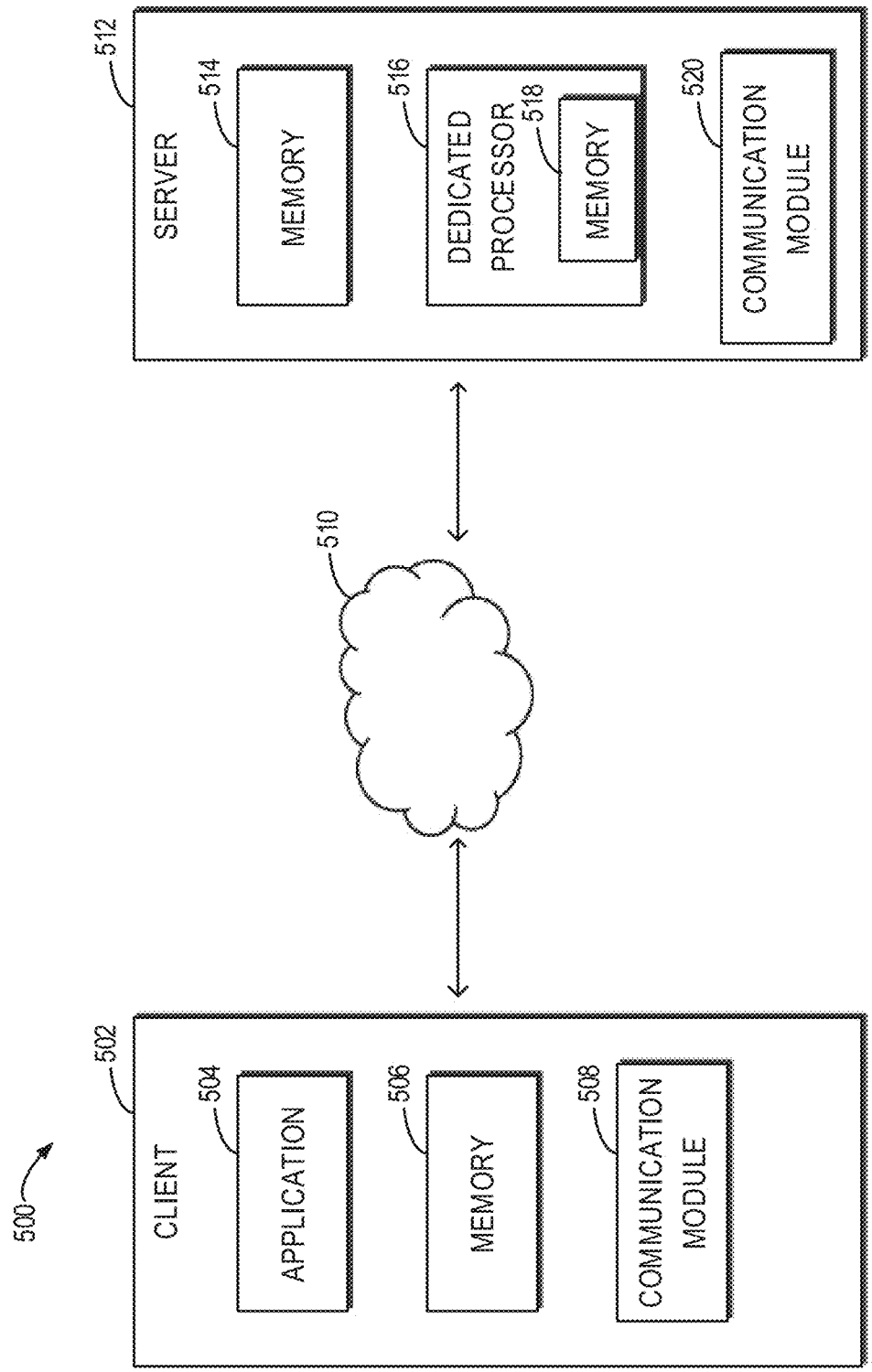
FIG. 5 illustrates a diagram of an example operating environment in which embodiments of the present disclosure can be implemented.

FIG. 5 illustrates a diagram of an example operating environment in which embodiments of the present disclosure can be implemented. It would be noted that the environment 500 is similar to the architecture 100 as shown in FIG. 1 but includes more details, so as to describe embodiments of the present disclosure clearly and thoroughly.

The environment 500 includes a client 502, a server 512 and a network 510. The client 502 and the server 512 communicate via a network 510. The client 502 may run thereon an application 504, such as a high computing application, machine learning application, deep learning application, and the like. The client 502 can include a memory 506 which stores various data associated with the application 504. In the case that the application 504 is a deep learning application, the memory 506 can store a dataset for training a deep learning model, such as an image dataset, speech dataset, text dataset and the like.

The server 512 can include a memory 514 and a dedicated processor 516. The memory 514 can store various types of data, for example data received from the client 502. The dedicated processor 516 can provide accelerated computing to the application 504 running on the client 502. The dedicated processor 516 includes a dedicated memory 518 which typically has a small capacity, for example 8 GB-16 GB, but an extremely high throughput, for example 900 GB/s.

In order to enable the client 502 and the server 512 to perform communication associated with the dedicated processor 516, the client 502 can include a communication module 508, and the server 512 can include a corresponding communication module 520. As described above, the client 502 exposes the virtual dedicated processor interface to the application 504. When the application 504 requests to call the virtual dedicated processor interface, the communication module 508 intercepts the request and transmits the request to the communication module 520 of the server 512. The communication module 520 receives the request and forwards the request to the dedicated processor 516 for related processing.

In the embodiments of the present disclosure, the communication module 508 obtains from the memory 506 the original data to be transmitted by the application 504 to the server 512, and determines whether the hash value of the original data is present in the predetermined set of hash values. If the hash value is present in the set of hash values, it indicates that the original data have been transmitted, and the communication module 508 thus transmits the hash value to the communication module 520 in the server 512, instead of the original data. If the hash value is not present in the set of hash values, it indicates that the original data have not been transmitted previously, and the communication module 508 thus transmits the original data to the communication module 520 and adds the hash value of the original data to the set of hash values.

At the server 512, upon receiving data from the client 502, the communication module 520 determines whether the received data are original data or the hash value of the original data. If the received data are original data, the communication module 520 stores the original data in the memory 514 using the hash values of the original data, and duplicates the original data to the memory 518 of the dedicated processor 516. If the received data are the hash value, the communication module 520 obtains the original data from the memory 514 using the hash value, and duplicates the original data to the memory 518, for processing by the dedicated processor 516.

In the embodiments of the present disclosure, by maintaining a set of hash values at the client 502, it is determined whether the original data to be transmitted have been transmitted previously, so as to determine locally at the client 502 whether the data to be transmitted belong to duplicated data, without waiting for a response from the server 512. Thereby the number of remote procedure calling commands transmitted between the client 502 and the server 512 is reduced, while avoiding transmission of duplicated data. As compared with the method 400, the solution according to embodiments of the present disclosure can significantly reduce the time for the dedicated processor 516 to wait for the data to be processed, so as to ensure the performance of the dedicated processor 516.

Figure 6:
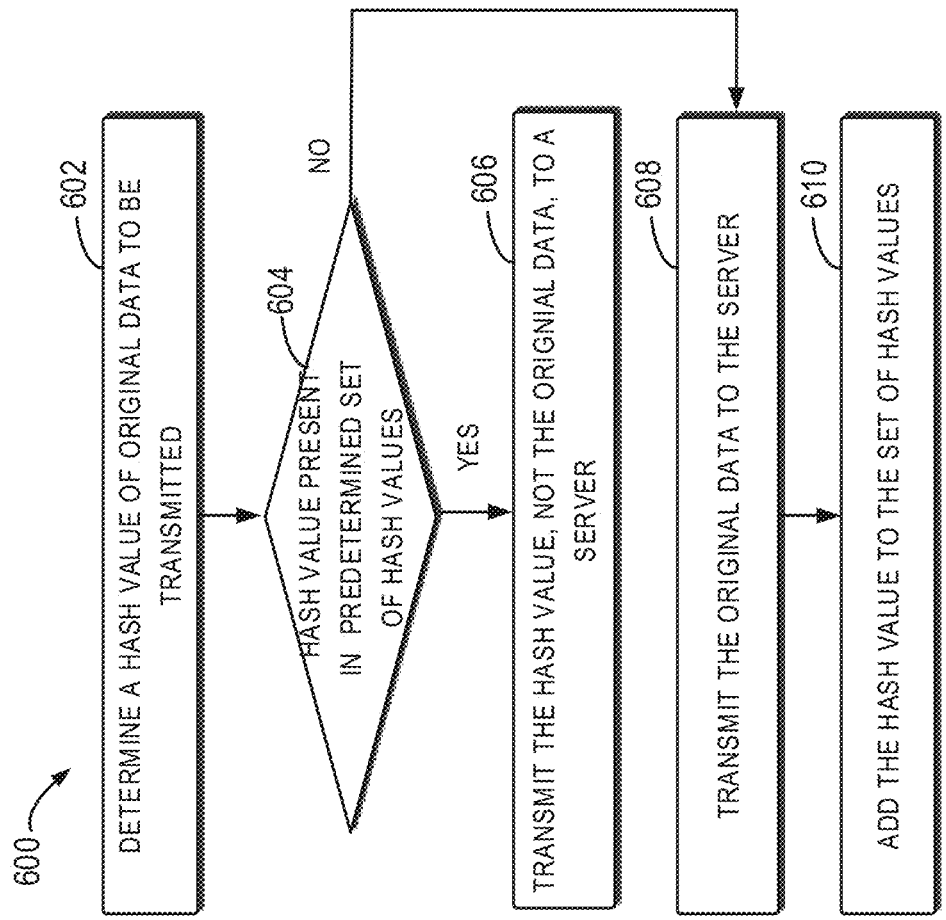
FIG. 6 illustrates a flowchart of a method of data transmission according to embodiments of the present disclosure.

FIG. 6 illustrates a flowchart of a method 600 of data transmission according to embodiments of the present disclosure. The method 600 can be performed by the client 502 as shown in FIG. 5, for example, by the communication module 508 in the client 502.

At block 602, the communication module 508 determines a hash value of original data to be transmitted. The communication module 508 can obtain the original data to be transmitted from the memory 506. In the embodiments of the present disclosure, the original data can be an image, piece of speech, text and the like, used by the application 504 for training a machine learning model, but the embodiments of the present disclosure are not limited to machine learning. The original data can be any data required to be transmitted between the client 502 and the server 512.

In the embodiments of the present disclosure, the communication module 508 can determine the hash value of the original data using a hash function. The length of the hash value is less than the length of the original data. For example, the hash function can be used to convert an image of 1 M bytes into a hash value of 256 bits, such that a compression representation of the image can be obtained.

At block 604, the communication module 508 determines whether the hash value is present in a predetermined set of hash values. The predetermined set of hash values stores therein hash values of the original data having been transmitted previously to the server 512. In the embodiments of the present disclosure, the set of hash values is initially empty, and as the original data are transmitted to the server 512, the set of hash values is constantly filled.

At block 606, in response to the hash value being present in the set of hash values, the communication module 508 transmits the hash value, not the original data, to the server 512. If the hash value is present in the set of hash values, it indicates that the original data associated with the hash value have been transmitted previously to the server 512. In this case, only the hash values having a length much less than the length of the original data are transmitted, so as to reduce the data amount transmitted over the network.

In the embodiments of the present disclosure, the communication module 508 can transmit an indication of the type of the hash value, together with the hash value, to the server 512, such that the server 512 can determine, based on the indication, that the received data are the hash value, rather than the original data.

At block 608, in response to the hash value being absent from the set of hash values, the communication module 508 transmits the original data to the server. If the hash value is not present in the set of hash values, it indicates that the original data have not been transmitted previously. In this case, it is required to transmit the original data to the server 512.

In the embodiments of the present disclosure, the communication module 508 can transmit an indication of the type of the hash value, together with the hash value, to the server 512, such that the server 512 can determine that the received data are the original data, rather than the hash value, based on the indication.

In the embodiments of the present disclosure, the communication module 508 can transmit the hash value, together with the original data, to the server 512. In this manner, it can be avoided that the hash value of the original data is recalculated at the server 512, thereby saving computing resources at the server 512.

At block 610, the communication module 508 adds the hash value to the set of hash values, to indicate that the original data associated with the hash value have been transmitted to the server 512. Hence, when it is required to transmit the original data to the server 512 again, duplicated transmission of the original data can be avoided.

Utilizing the method 600, it can be determined at the client locally whether the original data to be transmitted have been transmitted previously. If they have been transmitted previously, only the hash value of the original data is transmitted to reduce occupancy of the network resources. Moreover, the method 600 determines whether the original data have been transmitted previously, based on the set of hash values maintained locally, without the need of interacting with the server 512, thus it is not required to transmit extra remote procedure calling commands over the network. This enables the server 512 to obtain the desired data rapidly, unlike the existing method 400 in which the desired data can be obtained until the remote procedure calling commands are completed. Therefore, no matter whether the network bandwidth is limited, or the network latency is huge, or a radio bandwidth technology is utilized, the method 600 can ensure a high performance of the dedicated processor 516 in the server 512.

Figure 7:
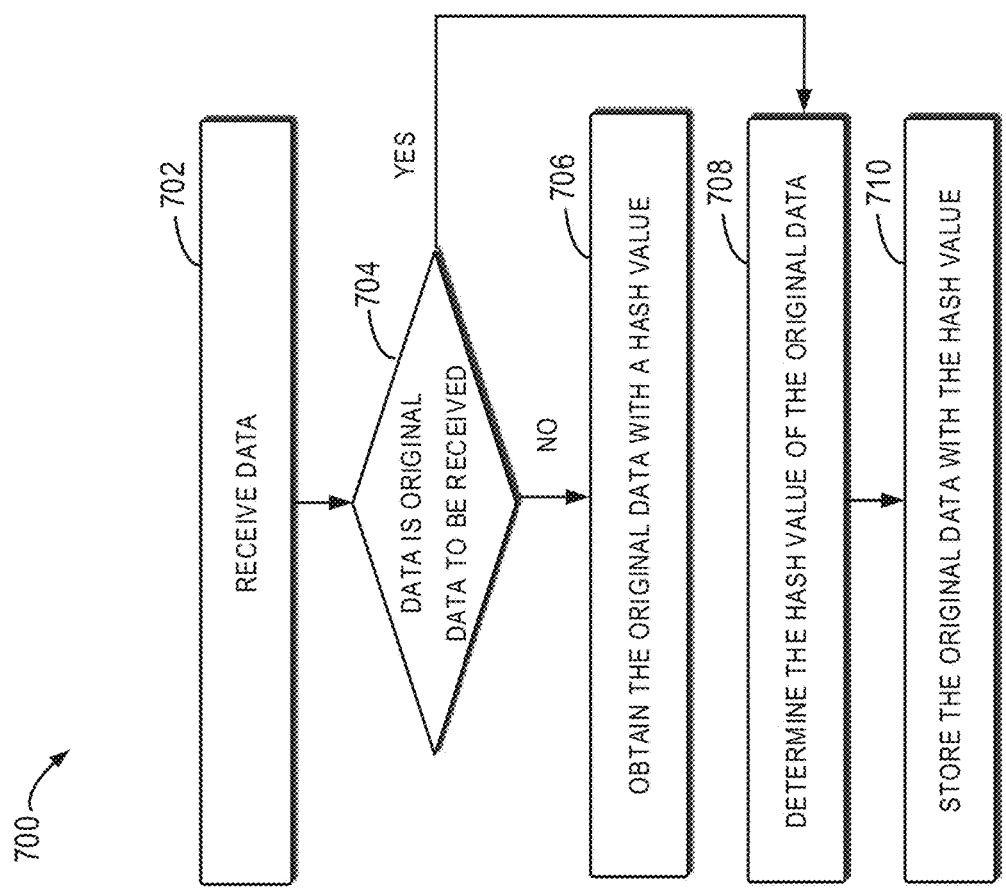
FIG. 7 illustrates a flowchart of a method of data reception according to embodiments of the present disclosure.

FIG. 7 illustrates a flowchart of a method 700 of data reception according to embodiments of the present disclosure. The method 700 can be performed by the server 512 as shown in FIG. 5, for example the communication module 520 in the server 512.

At block 702, the communication module 520 receives data. For example, the communication module 520 can receive data from the client 502. The data may be original data to be received, or may be a hash value of the original data to be received.

At block 704, the communication module 520 determines whether the received data are the original data to be received or the hash value of the original data. In the embodiments of the present disclosure, the communication module 520 can determine the type of the data, based on an indication of the type of the data received together with the data. For example, but not in a limiting manner, a type indicator bit can be used to represent the type of the data. For example, "0" represents a hash value, and "1" represents original data; or vice versa. The communication module 520 can determine the type of the data based on the length of the received data. For example, if the data length is 256 bits, it indicates that the data is the hash value, and if the data length is 1 M, it indicates that the data are original data (for example, an image). It would be appreciated by those skilled in the art that these numerical values are only provided as an example, and embodiments of the present disclosure are not limited in this regard.

At block 706, in response to the received data being the hash value of the original data, the communication module 520 obtains the original data with the hash value. If the received data are the hash value, it indicates that the original data have been transmitted previously to the server 512, and the server 512 has stored the original data. In this case, the communication module 520 can obtain the original data from the memory 514 based on the hash value of the original data. In the embodiments of the present disclosure, the server 512 can maintain, in the memory 514, a key-value store database for storing the original data based on the hash value. The communication module 520 can obtain the stored original data from the key-value store database, with the received hash value as a key.

At block 708, in response to the received data being the original data to be received, the communication module 520 determines the hash value of the original data. In the embodiments of the present disclosure, in a case that the client 502 transmits the hash value, together with the original data, to the server 512, the communication module 520 can extract the hash value directly from the received data. In this manner, the hash value determined at the client 502 can be used repeatedly to avoid repeated computing at the server 512, thus saving the computing resources at the server 512.

In the embodiments of the present disclosure, in the case that the client 502 only transmits the original data without the hash value, the communication module 520 can determine the hash value of the original data using the same hash value function as the one used at the client 502.

At block 710, the communication module 520 stores the original data in the memory 514 with the determined hash value. If the received data are original data, it indicates that the original data are transmitted to the server 512 for the first time. In this case, it is required to store the original data at the server 512, such that the original data can be retrieved if they are needed again. In the embodiments of the present disclosure, the server 512 can maintain a key-value store database in the memory 514. The server 512 can store the original data in the key-value store database, with the hash value as the key. Utilizing the key-value store database, the original data can be retrieved quickly based on the key.

In the embodiments of the present disclosure, considering the capacity of the memory and the amount of the store entries, the key-value store can be one of a hash map, B tree and combination of the above two. For example, in a case that there is no need of storing the original data to the hard disk, the hash map can be used. In a case that there is a need for storing the original data to the hard disk, the B tree can be used. Alternatively, the hash map can be used for a high speed cache, while the B tree can be used when the stored entries are evicted to the hard disk.

Subsequently, the communication module 520 can duplicate the received original data or the original data obtained from the memory 514 to the memory 518 of the dedicated processor 516, for processing by the dedicated processor 516, for example, for training a machine learning model.

Cooperation of the method 700 with the method 600 avoids transmitting duplicated data between the client 502 and the server 512, and it is not required to transmit the indication on whether the data is duplicated and whether the data is absent from the server 512 between the client 502 and the server 512 back and forth. Thereby, the number of the remote calling commands transmitted therebetween is reduced. In this way, it is ensured that the performance of the dedicated processor 516 is free from the network environment.

Referring to FIGS. 8A-8H, the general conception and advantages of the present disclosure would be more readily understood. FIGS. 8A-8H illustrate diagrams of a state of data to be transmitted, a state of a set of hash values and state of a key-value store as the methods 600 and 700 are performed.

Figure 8A:
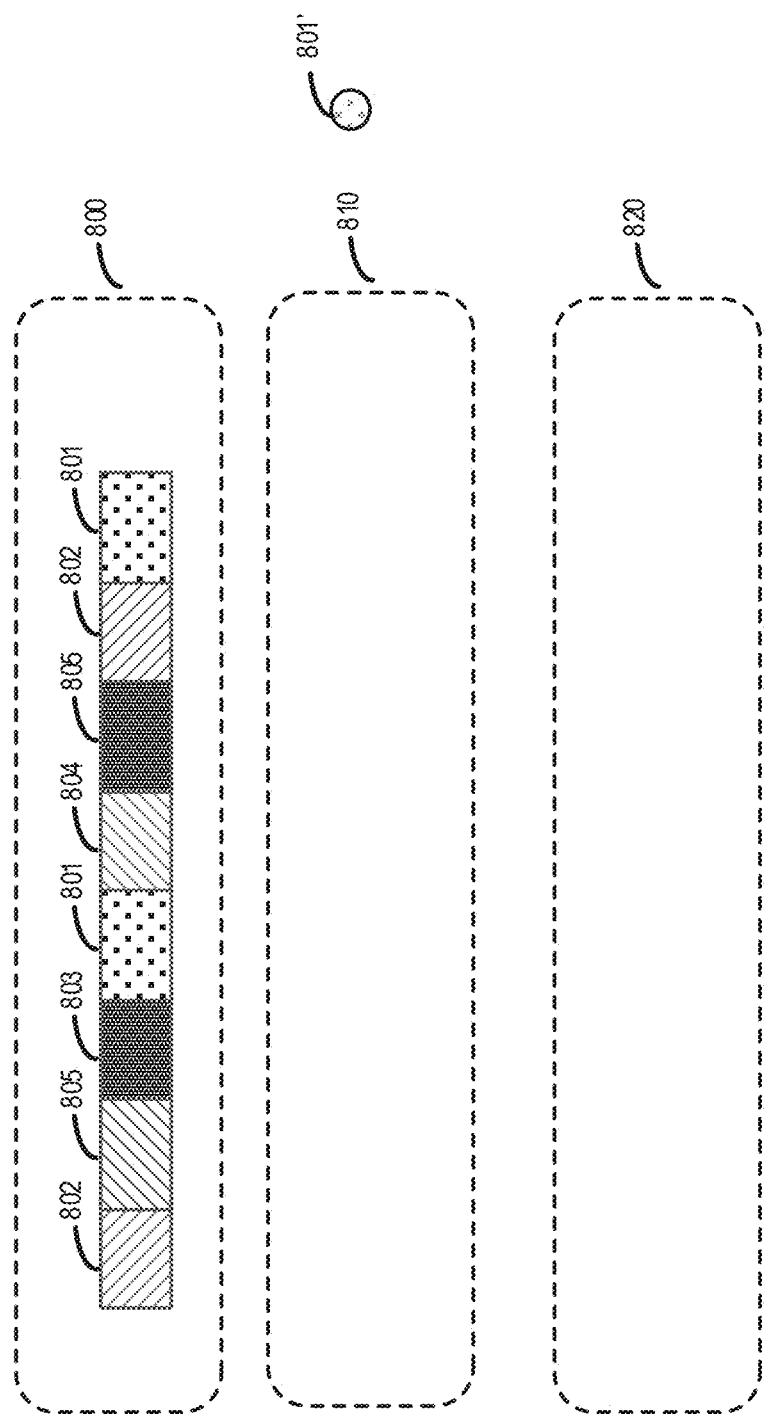
FIGS. 8A-8H illustrate diagrams of a state of data to be transmitted, a state of a set of hash values and a stage of a key-value storage.
Figure 8B:
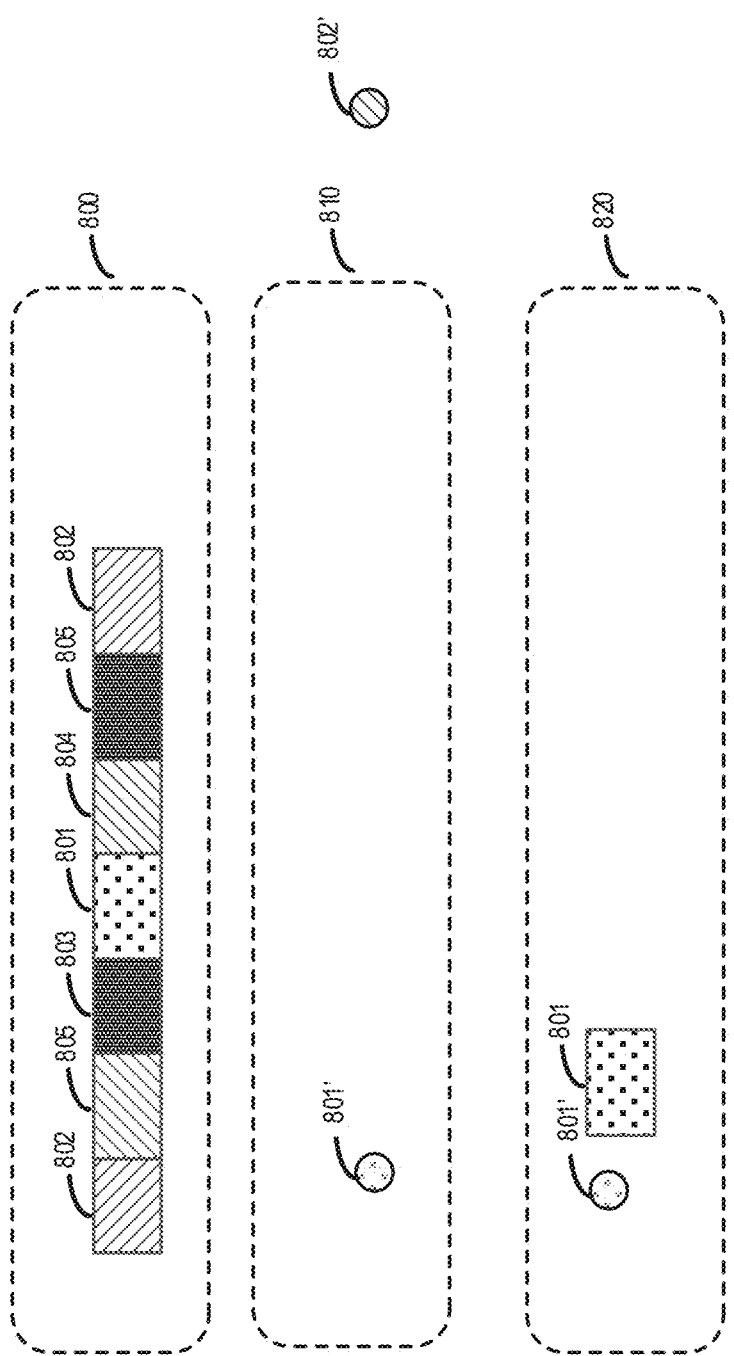

As shown in FIG. 8A, initially, a data sequence 800 to be transmitted includes data blocks 801, 802, 805, 804, 801, 803, 805 and 802. A set of hash values at the client 502 and key-value store at the server 512 are empty, respectively. In the example as shown in FIG. 8A, the original data to be transmitted currently is the data block 801. The client 502 determines that the hash value 801' of the data block 801 is not present in the set of hash values 810, and thus transmits the data block 801 to the server 512, and adds the hash value 801' to the set of hash values 810, as shown in FIG. 8B. The server 512 receives the data block 801, and stores the data block 801 in a key-value store 820, with the hash value 801' as a key, as shown in FIG. 8B.

Figure 8C:
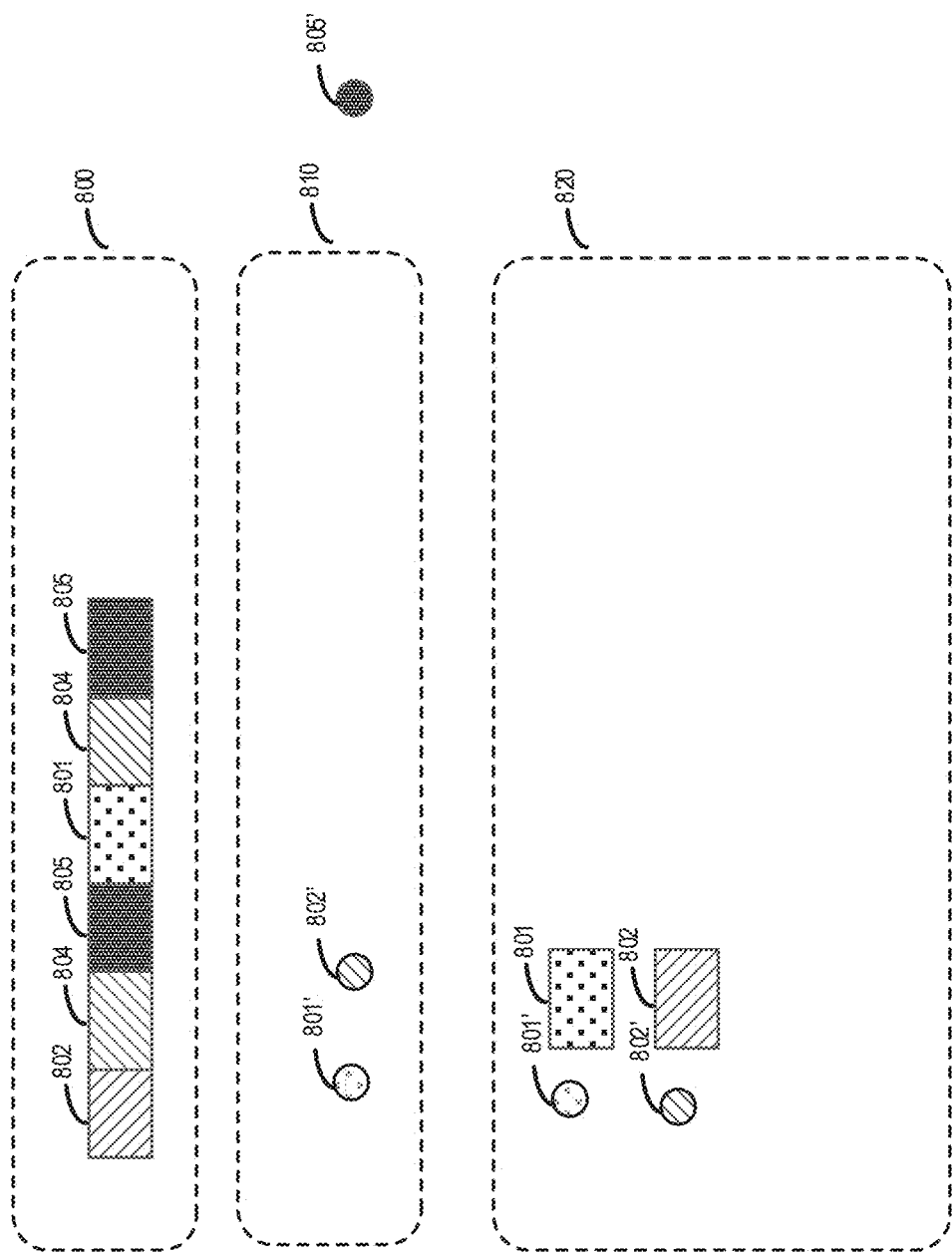

In FIG. 8B, the original data to be transmitted is the data block 802, and at the point of time, the set of hash values 810 includes the hash value 801', and the key-value store 820 includes the hash value 801'-data block 801. The client 502 determines that a hash value 802' of the data block 802 is not present in the set of hash values 810, and thus transmits the data block 802 to the server 512, and adds the hash value 802' to the set of hash values 810, as shown in FIG. 8C. The server 512 receives the data block 802, and stores the data block 802 in the key-value store 820, with the hash value 802' as a key, as shown in FIG. 8C.

Figure 8D:
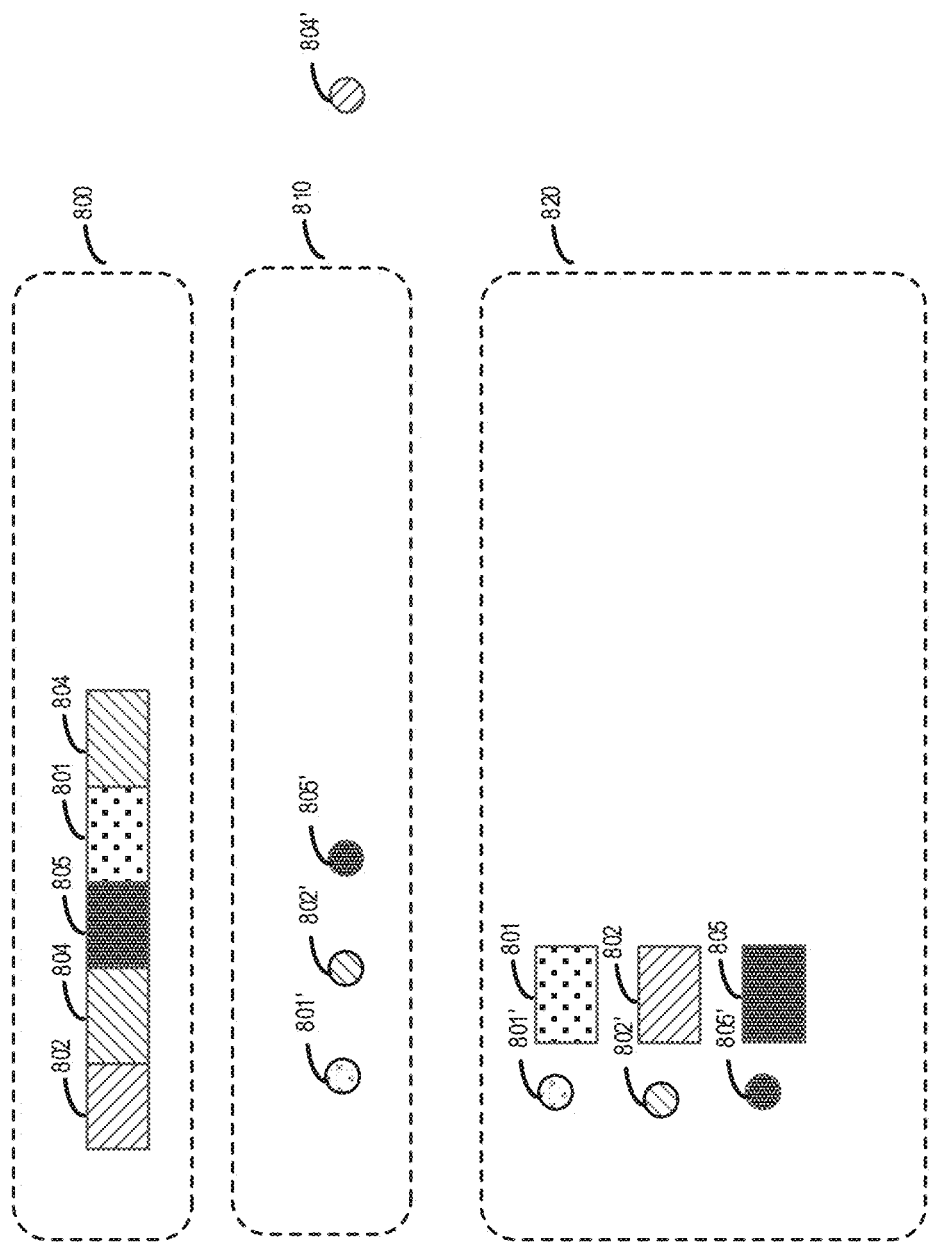

In FIG. 8C, the original data to be transmitted is the data block 805, and at this time, the set of hash values 810 includes the hash value 801' and the hash value 802', and the key-value store 820 includes the hash value 801'-data block 801 and the hash value 802'-data block 802. The client 502 determines that the hash value 805' of the data block 805 is not present in the set of hash values 810, and thus transmits the data block 805 to the server 512, and adds the hash value 805' to the set of hash values 810, as shown in FIG. 8D. The server 512 receives the data block 805, and stores the data block 805 in the key-value store 820, with the hash value 805' as a key, as shown in FIG. 8D.

Figure 8E:
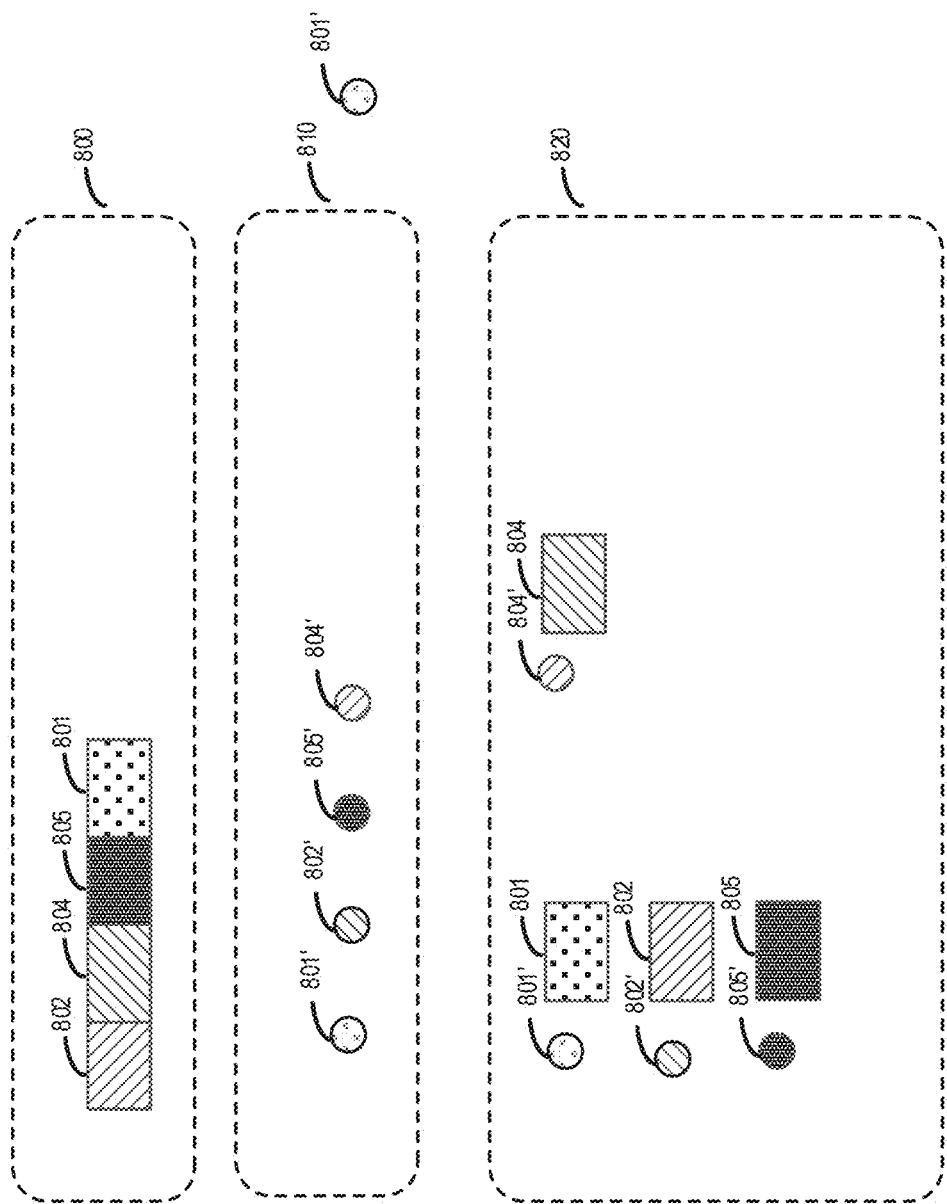

In FIG. 8D, the original data to be transmitted is the data block 804, and at this time, the set of hash values 810 includes the hash value 801', the hash value 802' and a hash value 805', and the key-value store 820 includes the hash value 801'-data block 801, the hash value 802'-data block 802 and the hash value 805'-data block 805. The client 502 determines that the hash value 804' of the data block 804 is not present in the set of hash values 810, and thus transmits the data block 804 to the server 512, and adds the hash value 804' to the set of hash values 810, as shown in FIG. 8E. The server 512 receives the data block 804, and stores the data block 804 in the key-value store 820, with the hash value 804' as a key, as shown in FIG. 8E.

In FIG. 8E, the original data to be transmitted is the data block 801, and at this time, the set of hash values 810 includes the hash value 801', the hash value 802', the hash value 805' and the hash value 804', and the key-value store 820 includes the hash value 801'-data block 801, the hash value 802'-data block 802, the hash value 805'-data block 805 and the hash value 804'-data block 804. The client 502 determines that the hash value 801' of the data block 801 is present in the set of hash values 810, and thus transmits the hash value 801', not the data block 801, but to the server, so as to avoid duplicated transmission of the data block 801. The server 512 receives the hash value 801', and obtains the data block 801 stored previously from the key-value store 820, with the hash value 801' as a key.

Figure 8F:
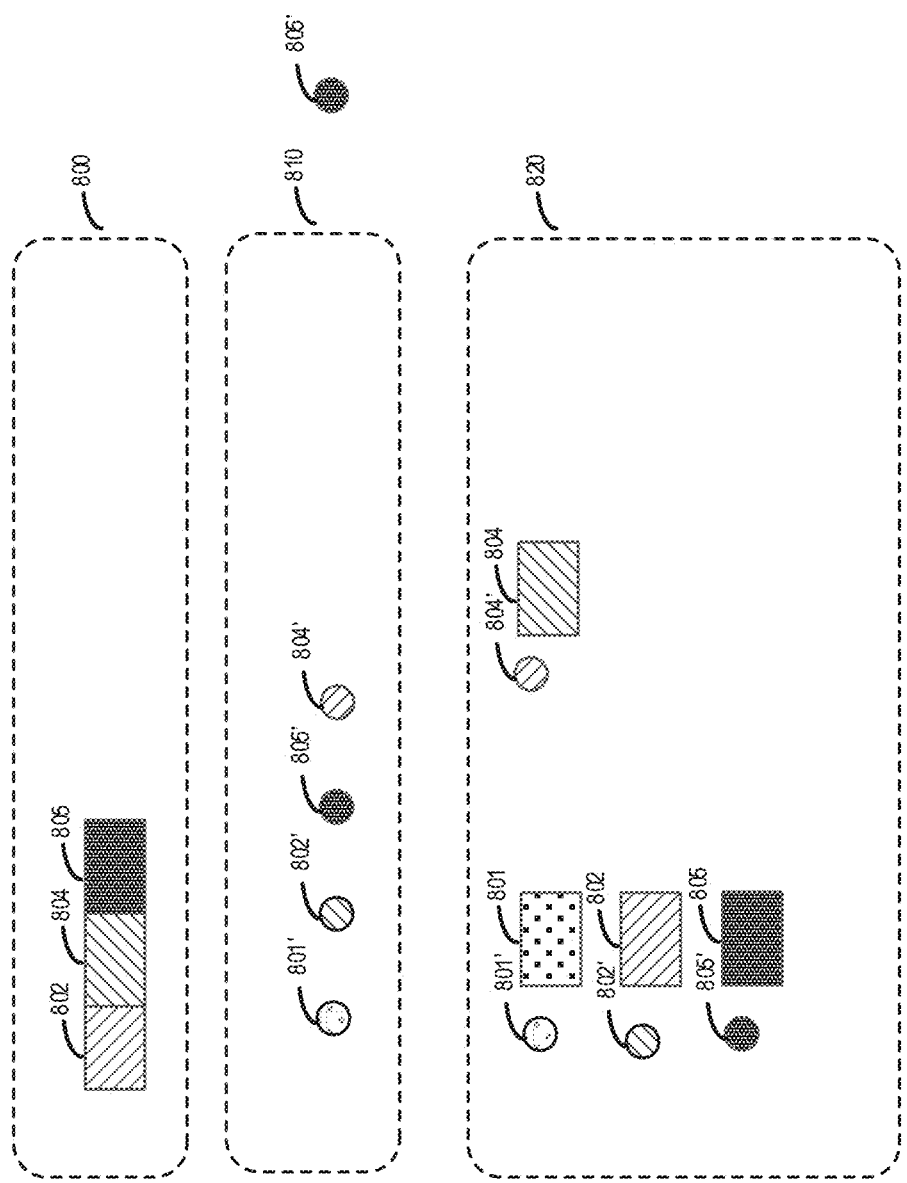

In FIG. 8F, the original data to be transmitted is the data block 805, and at this time, the set of hash values 810 includes the hash value 801', the hash value 802', the hash value 805' and the hash value 804', and the key-value store 820 includes the hash value 801'-data block 801, the hash value 802'-data block 802, the hash value 805'-data block 805 and the hash value 804'-data block 804. The client 502 determines that the hash value 805' of the data block 805 is present in the set of hash values 810, and thus transmits the hash value 805', not the data block 805, but to the server 512, so as to avoid duplicated transmission of the data block 805. The server 512 receives the hash value 805', and obtains the data block 805 stored previously from the key-value store 820, with the hash value 805' as a key.

Figure 8G:
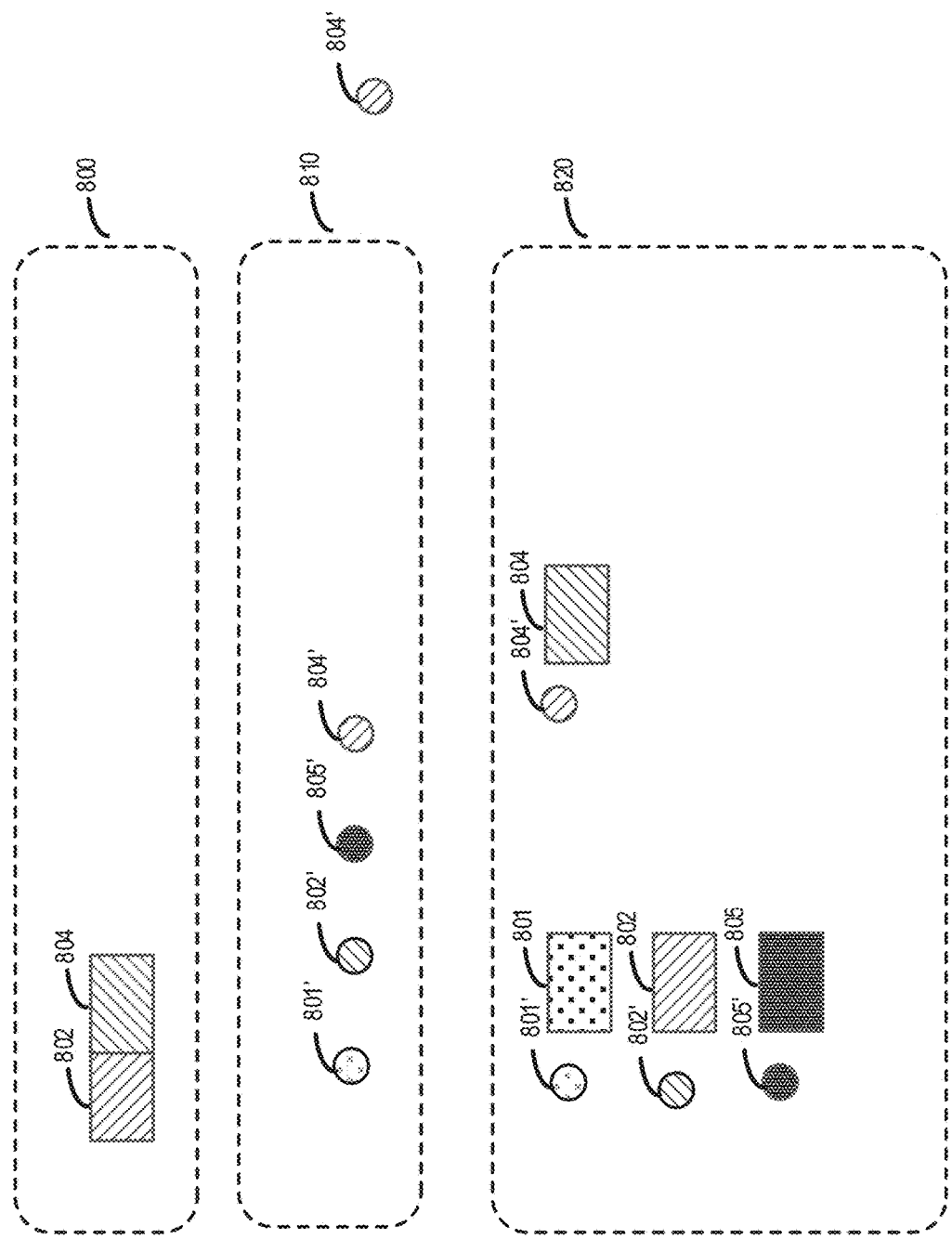

In FIG. 8G, the original data to be transmitted is the data block 804, and at this time the set of hash values 810 includes the hash value 801', the hash value 802', the hash value 805' and the hash value 804', and the key-value store 820 includes the hash value 801'-data block 801, the hash value 802'-data block 802, the hash value 805'-data block 805 and the hash value 804'-data block 804. The client 502 determines that the hash value 804' of the data block 804 is present in the set of hash values 810, and thus transmits the hash value 804', not the data block 804, but to the server 512, so as to avoid duplicated transmission of the data block 804. The server 512 receives the hash value 804', and obtains the data block 804 stored previously from the key-value store 820, with the hash value 804' as a key.

Figure 8H:
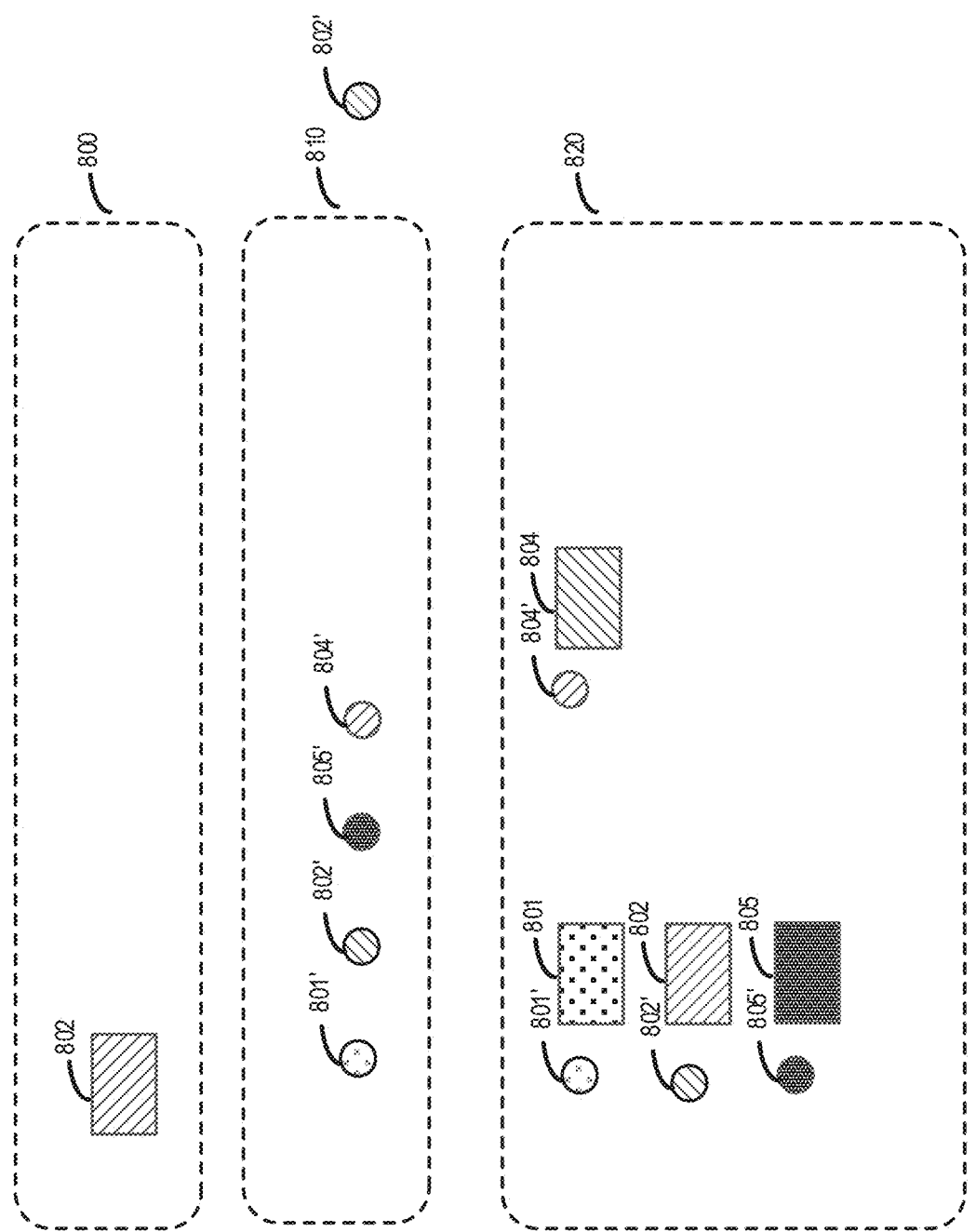

In FIG. 8H, the original data to be transmitted is the data block 802, and at this time the set of hash values 810 includes the hash value 801', the hash value 802', the hash value 805' and the hash value 804', and the key-value store 820 includes the hash value 801'-data block 801, the hash value 802'-data block 802, the hash value 805'-data block 805 and the hash value 804'-data block 804. The client 502 determines that the hash value 802' of the data block 802 is present in the set of hash values 810, and thus transmits the hash value 802', not the data block 802, but to the server 512, so as to avoid duplicated transmission of the data block 802. The server 512 receives the hash value 802', and obtains the data block 802 stored previously from the key-value store 820, with the hash value 802' as a key.

In the embodiments of the present disclosure, the client 502 determines whether the original data to be transmitted have been transmitted previously, based on the hash value of the original data to be transmitted and the set of hash values maintained locally, and it is not required to request the server 512 to perform the determination. Thus the number of the remote procedure calling commands between the client 502 and the server 512 can be reduced while avoiding the duplicated transmission of data. On the other hand, the server 512 determines that the original data associated with the hash value have been stored at the server 512, based on the hash value transmitted by the client 502, and obtains the original data based on the hash value. The dedicated processor 516 can be used to perform accelerated computing without waiting for the client 502 to transmit the original data. Hence, duplicated transmission of data can be avoided, and it is possible to ensure that the performance of the dedicated processor 516 is free from the network environment.

Figure 9:
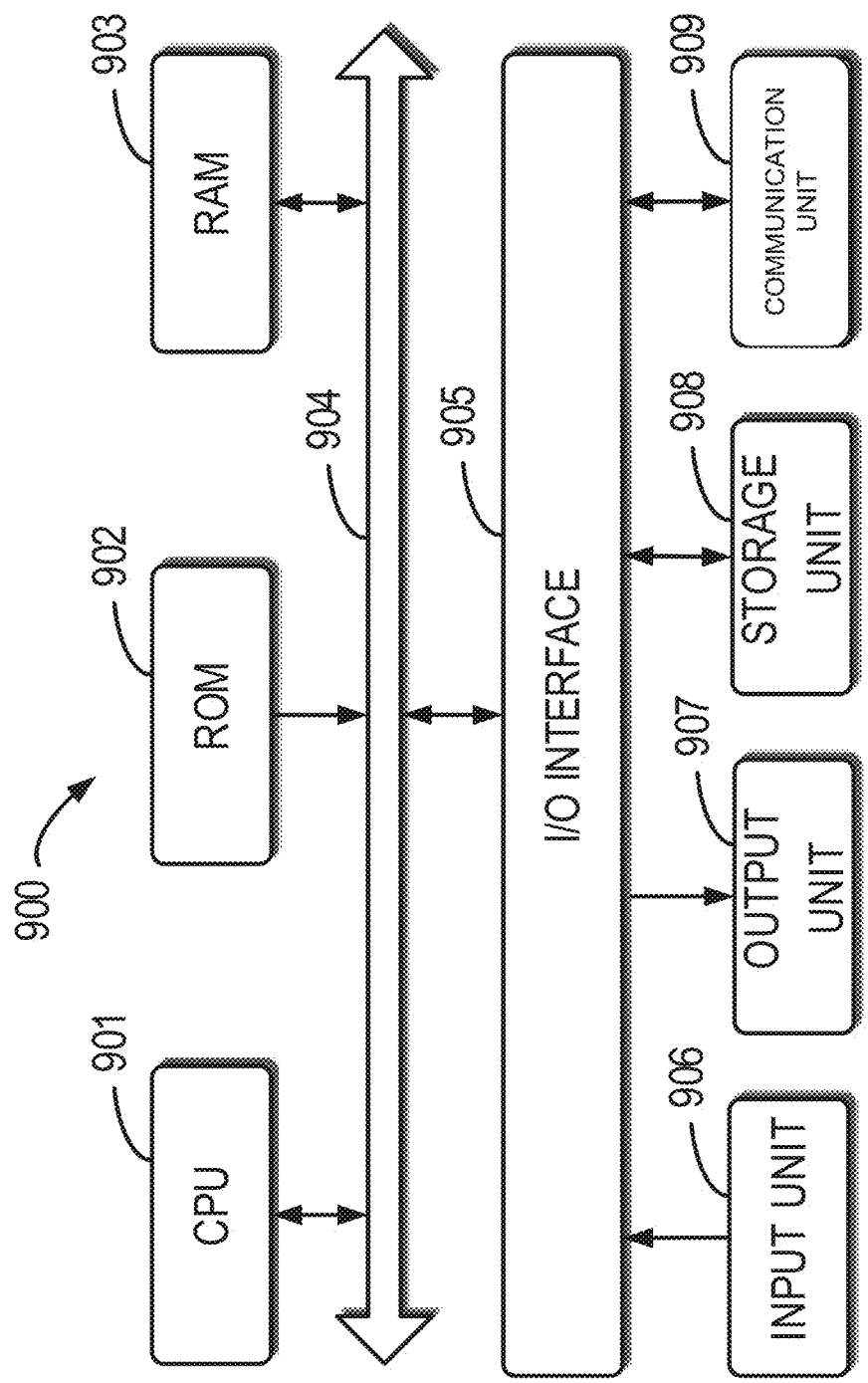
FIG. 9 illustrates a block diagram of an example device for implementing embodiments of the present disclosure.

FIG. 9 illustrates a diagram of an example device 900 for implementing embodiments of the present disclosure. The device 900 can implement a client 502 and a server 512 as shown in FIG. 5. As shown therein, the device 900 includes a central processing unit (CPU) 901 which performs various appropriate acts and processing, based on a computer program instruction stored in a read-only memory (ROM) 902 or a computer program instruction loaded from a storage unit 908 to a random access memory (RAM) 903. The RAM 903 stores therein various programs and data required for operations of the device 900. The CPU 901, the ROM 902 and the RAM 903 are connected via a bus 904 with one another. An input/output (I/O) interface 905 is also connected to the bus 904.

The following components in the device 900 are connected to the I/O interface 905: an input unit 906 such as a keyboard, a mouse and the like; an output unit 907 including various kinds of displays and a loudspeaker, etc.; a storage unit 908 including a magnetic disk, an optical disk, and etc.; a communication unit 909 including a network card, a modem, and a wireless communication transceiver, etc. The communication unit 909 allows the device 900 to exchange information/data with other apparatus through a computer network such as the Internet and/or various kinds of telecommunications networks.

Various processes and processing described above, e.g., the method 600 and/or method 700, may be executed by the processing unit 901. For example, in some embodiments, the method 600 and/or method 700 may be implemented as a computer software program that is tangibly included in a machine readable medium, e.g., the storage unit 908. In some embodiments, part or all of the computer programs may be loaded and/or mounted onto the device 900 via ROM 902 and/or communication unit 909. When the computer program is loaded to the RAM 903 and executed by the CPU 901, one or more steps of the method 600 and/or 700 as described above may be executed. Alternatively, the CPU 901 can be configured to perform the method 600 and/or method 700 in any other appropriate manner (for example, by means of firmware) in other embodiments.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods according to the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A method of data transmission, comprising:
   maintaining, by a client, a predetermined set of hash values of original data, the original data having been transmitted previously to a server, wherein the server is remote from the client and is configured to provide accelerated processing capabilities to the client;
   determining, by the client, a hash value for original data to be transmitted by the client to the server;
   determining, by the client, whether the hash value is present in the predetermined set of hash values;
   in response to the hash value being present in the predetermined set of hash values: transmitting the hash value together with an indication of a type of the hash value, rather than the original data, from the client to the server; and
   in response to the hash value being absent from the predetermined set of hash values:
      transmitting the original data from the client to the server; and
      adding the hash value to the predetermined set of hash values.

2. The method of claim 1, wherein transmitting the original data to the server comprises:
   transmitting to the server an indication of a type of the original data together with the original data.

3. The method of claim 1, wherein transmitting the original data to the server comprises:
   transmitting to the server the hash value together with the original data.

4. A computer readable storage medium for storing computer readable instructions which, when executed, cause a machine to perform steps of the method of claim 1.

5. An electronic device, comprising:
   a processor; and
   a memory coupled to the processor and storing instructions which, when executed by the processor, cause the electronic device to perform acts of:
   maintaining, by a client, a predetermined set of hash values of original data, the original data having been transmitted previously to a server, wherein the server is remote from the client and is configured to provide accelerated processing capabilities to the client;
   determining, by the client, a hash value for original data to be transmitted by the client to the server;
   determining, by the client, whether the hash value is present in the predetermined set of hash values;
   in response to the hash value being present in the predetermined set of hash values: transmitting the hash value together with an indication of a type of the hash value, rather than the original data, from the client to the server; and
   in response to the hash value being absent from the predetermined set of hash values:
      transmitting the original data from the client to the server; and
      adding the hash value to the predetermined set of hash values.

6. The electronic device of claim 5, wherein transmitting the original data to the server comprises:
   transmitting to the server an indication of a type of the original data together with the original data.

7. The electronic device of claim 5, wherein transmitting the original data to the server comprises:
   transmitting to the server the hash value together with the original data.

8. A method of data reception, comprising:
   receiving, at a server, data from a client;
   determining, by the server, a type of the data received from the client, the type of the data being based on a type indicator representing whether the received data are original data or a hash value of the original data, the original data indicating data not previously submitted from the client to the server, the hash value of the original data indicating data previously submitted from the client to the server, wherein the server is remote from the client and is configured to provide accelerated processing capabilities to the client;

in response to the data being original data received from the client,
  determining a hash value of the original data; and
  storing the original data with the hash value at the server; and in response to the data being a hash value of the original data,
  obtaining the original data with the hash value.

9. The method of claim 8, wherein storing the original data with the hash value comprises:
  storing the original data in a key-value store, with the hash value as a key.

10. The method of claim 9, wherein obtaining the original data with the hash value comprises:
  obtaining the original data from the key-value store with the hash value.

11. The method of claim 9, wherein the key-value store comprises one of a hash map, a B tree, or a combination thereof.

12. The method of claim 8, further comprising:
  duplicating the original data into a dedicated processor for processing by the dedicated processor.

13. A computer readable storage medium for storing computer readable instructions which, when executed, cause a machine to perform steps of claim 8.

14. An electronic device, comprising:
  a processor; and
  a memory being coupled to the processor and storing instructions which, when executed by the processor, cause the electronic device to perform acts of:
  receiving, at a server, data from a client;
  determining, by the server, a type of the data received from the client, the type of the data being based on a type indicator representing whether the received data are original data or a hash value of the original data, the original data indicating data not previously submitted from the client to the server, the hash value of the original data indicating data previously submitted from the client to the server wherein the server is remote from the client and is configured to provide accelerated processing capabilities to the client;

in response to the data being original data received from the client,
  determining a hash value of the original data; and
  storing the original data with the hash value at the server; and in response to the data being a hash value of the original data,
  obtaining the original data with the hash value.

15. The electronic device of claim 14, wherein storing the original data with the hash value comprises:
  storing the original data in a key-value store, with the hash value as a key.

16. The electronic device of claim 15 wherein obtaining the original data with the hash value comprises:
  obtaining the original data from the key-value store with the hash value.

17. The electronic device of claim 15, wherein the key-value store comprises one of a hash map, a B tree, or a combination thereof.

18. The electronic device of claim 14, further comprising:
  duplicating the original data into a dedicated processor for processing by the dedicated processor.

19. The method of claim 8, wherein the type of data comprises a type indicator bit representing the type of the data.

20. The electronic device of claim 14, wherein the type of data comprises a type indicator bit representing the type of the data.

* * * * *